(12) United States Patent
Omura et al.

(10) Patent No.: US 9,251,456 B2
(45) Date of Patent: Feb. 2, 2016

(54) RFID INFORMATION MEDIUM AND ARTICLE TO WHICH THE MEDIUM IS ATTACHED

(75) Inventors: Kunio Omura, Saitama (JP); Yuji Sakai, Asaka (JP); Hidemi Nakajima, Koshigaya (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 432 days.

(21) Appl. No.: 12/311,246

(22) PCT Filed: Sep. 26, 2007

(86) PCT No.: PCT/JP2007/068697
§ 371 (c)(1),
(2), (4) Date: Aug. 6, 2009

(87) PCT Pub. No.: WO2008/038672
PCT Pub. Date: Apr. 3, 2008

(65) Prior Publication Data
US 2009/0302120 A1    Dec. 10, 2009

(30) Foreign Application Priority Data

Sep. 26, 2006   (JP) .................................. 2006-260975

(51) Int. Cl.
*G06K 19/07*   (2006.01)
*G03H 1/02*   (2006.01)
*G06K 19/06*   (2006.01)
*G06K 19/08*   (2006.01)
(Continued)

(52) U.S. Cl.
CPC .............. *G06K 19/0723* (2013.01); *G03H 1/02* (2013.01); *G03H 1/0256* (2013.01); *G06K 19/06009* (2013.01); *G06K 19/08* (2013.01); *G06K 19/16* (2013.01); *G06K 19/18* (2013.01); *G03H 1/0011* (2013.01); *G03H 1/0244* (2013.01); *G03H 2250/36* (2013.01)

(58) Field of Classification Search
USPC .......................................................... 235/492
See application file for complete search history.

(56) References Cited

U.S. PATENT DOCUMENTS 6,164,548 A    12/2000   Curiel
6,181,287 B1 *  1/2001   Beigel ........................... 343/741
(Continued)

FOREIGN PATENT DOCUMENTS

EP    1179811 A1    2/2002
JP    2002-366915    12/2002
(Continued)

OTHER PUBLICATIONS

PCT Search Report issued on Dec. 12, 2007 in corresponding PCT Patent Application PCT/JP2007/068697.
(Continued)

*Primary Examiner* — Michael G Lee
*Assistant Examiner* — David Tardif

(57) ABSTRACT

An RFID information medium transmits and receives data to and from an external reader in a noncontact manner. The RFID information medium is provided with a main body section having an insulating member, either an antenna or an antenna member arranged on the main body section, and a conductor arranged on the main body section. The conductor has a conductive material layer. The conductive material layer partially overlaps the antenna or the antenna member in the thickness direction of the main body section.

7 Claims, 6 Drawing Sheets

(51) Int. Cl.
*G06K 19/16* (2006.01)
*G06K 19/18* (2006.01)
*G03H 1/00* (2006.01)

(56) References Cited

U.S. PATENT DOCUMENTS

| | | | |
|---|---|---|---|
| 7,262,701 B1 * | 8/2007 | Nguyen | 340/572.7 |
| 2004/0074974 A1 * | 4/2004 | Senba et al. | 235/492 |
| 2005/0007296 A1 * | 1/2005 | Endo et al. | 343/895 |
| 2005/0024290 A1 * | 2/2005 | Aisenbrey | 343/873 |
| 2005/0054317 A1 | 3/2005 | Ro et al. | |
| 2005/0141150 A1 * | 6/2005 | Bentley et al. | 361/2 |
| 2008/0259416 A1 * | 10/2008 | Peters et al. | 359/2 |

FOREIGN PATENT DOCUMENTS

| | | |
|---|---|---|
| JP | 2003-30612 | 1/2003 |
| JP | 2004-78725 | 3/2004 |
| JP | 2005-115862 | 4/2005 |
| JP | 2005-526304 | 9/2005 |
| JP | 2006-44740 | 2/2006 |
| JP | 3123411 | 7/2006 |
| TW | 541763 | 7/2003 |
| WO | 03/054808 A2 | 7/2003 |
| WO | 2005/034028 A1 | 4/2005 |
| WO | 2005/091434 A1 | 9/2005 |
| WO | 2008/038672 A1 | 4/2008 |

OTHER PUBLICATIONS

Notification Concerning Submission or Transmittal of Priority Document issued on Sep. 26, 2007 in corresponding PCT Patent Application PCT/JP2007068697.
Published PCT Application in corresponding PCT Patent Application PCT/JP2007/068697.
Office Action issued by the Japanese Patent Office on Jul. 30, 2013 in the corresponding Japanese patent application No. 2012-224292.
Office Action issued by the Taiwanese Patent Office on Feb. 23, 2013 in corresponding Taiwanese patent application No. 096135700.
European Office Action issued Jun. 13, 2014 in the corresponding European patent application No. 07 828 443.7.
European search report dated Dec. 27, 2011 issued in corresponding European Patent Application No. 07828443.7.

* cited by examiner

RFID INFORMATION MEDIUM AND ARTICLE TO WHICH THE MEDIUM IS ATTACHED

CROSS REFERENCE TO RELATED APPLICATIONS

This application claims the benefit under 35 U.S.C. Section 371, of PCT International Application No. PCT/JP2007/068697, filed Sep. 26, 2007, which claimed priority to Japanese Application No. 2006-260975, filed Sep. 26, 2006 in the Japanese Patent Office, the disclosures of which are hereby incorporated by reference.

TECHNICAL FIELD

The present invention relates to an RFID information medium capable of transmitting and receiving data to and from an external reader (or read/write device) in a noncontact manner, and an article to which the medium is attached.

BACKGROUND ART OF THE INVENTION

Conventionally, to manage goods in a retail store or a rental store, an RFID (Radio Frequency IDentification) tag having an IC chip and an antenna is used (for example, see the following Patent Document 1). For example, loading and unloading management, inventory management, and lending management for goods are performed by attaching the RFID tag to goods and reading and writing data of the goods using a dedicated data read/write device. Since the RFID tag has the IC chip, abundant information such as a date of arrival of goods, to person in charge and as well as a goods code. Since the distance of an RFID tag of a radio wave scheme using a microwave (currently being used at 2.45 GHz) which can communicate is 1 to 2 m longer than that of an RFID tag using electrostatic coupling or electromagnetic induction, it is used in many fields such as article management.

As the RFID tag becomes widely used, it is expected that an OVD (Optical Variable Device) is attached to the RFID tag. The OVD is a generic term of a device exhibiting special optical effects in which a color changes, a three-dimensional image is viewed, or an image changes when looked at from different angles. For example, the OVD is a generic term of a hologram or diffraction grating capable of expressing a three-dimensional image or decoration image using optical interference and a multilayer thin film formed of stacked thin films having different optical characteristics in which the color of the multilayer thin film changes when looked at from different angles. Since these OVDs have the effect of providing an excellent appearance and giving a distinctive impression of a three-dimensional image or color change to a viewer, they are used to produce various printed materials, such as, for example, packaging materials, picture books, and catalogs. Since a high level of technology is required to manufacture the OVD, it is also provided as an anti-counterfeiting means in, for example, credit cards, securities, and certifications.

When the OVD is attached to the RFID tag, there are to following merits. When the RFID tag and the OVD, which are normally attached separately, are integrated by attaching the OVD to the RFID tag, the RFID tag and the OVD can be speedily and easily attached to the goods. By attaching the OVD to the RFID tag, the design or classy feeling of goods can be improved or the counterfeit of goods can be prevented. It is possible to perform true/false judgment of the RFID tag from both a read operation by a reader (or read/write device) and a visual contact by attaching the OVD to the RFID tag for the anti-counterfeiting effect. Even when no reader (or read/write device) is provided, it is possible to perform the true/false judgment of the RFID tag by the visual contact. In the case where the RFID tag to which the OVD is attached is used as an advanced anti-counterfeiting medium, it is possible to perform the true/false judgment even when either the OVD or the IC chip is faked, by recording machine-readable optical information in the OVD and making a connection with information within the IC chip of the RFID tag.

As described above, it can be expected that the RFID tag to which the OVD is attached will develop in various applications.

Patent Document 1: Japanese Unexamined Patent Application, First Publication No. 2004-78725

DETAILED DESCRIPTION OF THE INVENTION

Problems to be Solved by the Invention

However, when the OVD is attached to the RFID tag, there is a problem in that an error may occur in communication between the reader (or read/write device) and the RFID tag. Specifically, errors may occur when a multilayer thin film is used in the OVD and a thin film material has conductivity, or when a hologram or diffraction grating is used in the OVD and, for example, an aluminum deposited layer is provided to have its optical effect. The OVD shields a radio wave from the reader (or read/write device) when the OVD is close to an antenna of the RFID tag since the above-described OVD has conductivity, or a resonance frequency is shifted when the OVD affects the antenna of the RFID tag. Thus, the distance between the reader (or read/write device) and the RFID tag is shortened and communication between the two is disabled in some cases.

As a countermeasure thereof, for example, the OVD can be arranged by separating it from the antenna of the RFID tag. However, when the OVD is separated from the antenna the entire RFID tag is enlarged, thereby making it difficult to create a small-sized RFID tag. Also, the size or design of the OVD is restricted.

The present invention has made in view of the above-described situation and an object of the invention is to provide an RFID information medium that can properly communicate with a reader (or read/write device) and that can be miniaturized easily.

Means for Solving the Problem

To solve the above problem, the present invention provides the following means.

According to the present invention, an RFID information medium for transmitting and receiving data to and from an external reader in a noncontact manner, includes: a main body section having an insulating member; an antenna arranged on the main body section; and a conductor arranged on the main body section, wherein the conductor has a conductive material layer and the conductive material layer partially overlaps the antenna in a thickness direction of the main body section.

Here, if the conductive material layer partially overlaps the antenna in the thickness direction of the main body section, it indicates a state in which the conductive material layer of the conductor overlaps one to several proper positions in one side of the antenna by setting a portion where an IC chip is located in the antenna. The conductive material layer may substantially overlap the entire surface of one side of the antenna. When conductive material layers overlap two sides of the antenna, two layers need to be formed so that the conductive material layer of one side is not connected to the conductive material layer of the other side. When the conductive material layers are formed on substantially the entire surface of one side of the antenna and substantially the entire surface of the opposite side of the antenna, the layer formed on one side of the antenna should be slightly separated from the layer formed on the opposite side (a spacing of at least about 50 μm is needed).

The conductor and the antenna may be electrically contacted in the thickness direction by capacitive coupling. In the RFID information medium of the present invention, part of the antenna and the conductor are arranged to face in the thickness direction of the main body section. Thus, the antenna is electrically connected to the conductor by capacitive coupling. To capacitively couple the two, an insulating layer is arranged to secure a proper spacing between the two so that a condenser is formed by the overlap of the conductive material layer of the conductor and the antenna. Thereby, the antenna and the conductor can simply and surely function as one antenna.

According to the present invention, an RFID information medium for transmitting and receiving data to and from an external reader in a noncontact manner, includes: a main body section having an insulating member; an antenna member arranged on the main body section; and a conductor arranged on the main body section, wherein the conductor has a conductive material layer and the conductive material layer partially overlaps the antenna member in a thickness direction of the main body section.

Here, if the conductive material layer partially overlaps the antenna member in the thickness direction of the main body section, it indicates a state in which the conductive material layer of the conductor overlaps one to several proper positions on one side of the antenna member by setting a portion where an IC chip is located in the antenna member to a substantial boundary. The conductive material layer may substantially overlap the entire surface of one side of the antenna member.

The conductor and the antenna member may be electrically contacted in the thickness direction by capacitive coupling. In the RFID information medium of the present invention, part of the antenna member and the conductor are arranged to face the thickness direction of the main body section. Thus, the antenna member is electrically connected to the conductor by capacitive coupling. To capacitively couple the two, an insulating layer is arranged to secure a proper spacing between the two so that a condenser is formed by the overlap of the conductive material layer of the conductor and the antenna member. Thereby, the antenna member and the conductor can simply and surely function as one antenna.

The "antenna" functions as an independent antenna by itself, and the "antenna member" does not function as an independent antenna by itself.

The antenna may be directly connected to the conductor by interposing a conductive member and the antenna member may be directly connected to the conductor by interposing a conductive member.

When the IC chip of the RFID information medium can read and write data, it is possible to write the data using the read/write device.

In the RFID information medium of the present invention, the antenna member may have an antenna function generated by cooperating with the conductor without an independent antenna function.

According to the RFID information medium of the present invention, the antenna member and the conductor function as the antenna by cooperation. When the conductor is removed, the remaining antenna member stops functioning as an antenna. When the conductor is removed intentionally, the RFID information medium cannot communicate. Thereby, security can be improved.

In the RFID information medium of the present invention, the antenna member may be formed for a dipole antenna in a long shape, a length of the antenna member is set to be shorter than a length in which communication may be possible with respect to a wavelength of a carrier for performing data communication, and total length in which the overlapped antenna member and conductor are combined may be set to a length in which communication is possible.

According to the RFID information medium of the present invention, the antenna member and the conductor function as one dipole antenna by cooperation. When the conductor is removed intentionally, the RFID information medium cannot communicate. Thereby, security can be improved.

The RFID information medium of the present invention may further include an optical variable device in which the color or the image changes depending on the point of view. The optical variable device includes a conductive reflective layer or a conductive transparent layer, wherein the reflective layer or the transparent layer of the optical variable device may form as the conductive material layer. According to the RFID information medium of the present invention, the optical variable device shows the effect of excellent decoration of giving a distinctive impression of a three-dimensional image or a color change to a viewer. As representative examples of the viewpoint there is a case where a color or image changes according to a view angle, a case where a color or image changes by viewing through a polarizing plate (a circularly polarizing plate as a preferred example). The representative example of the former may include the case where a hologram, a diffracting grating, a multilayer thin film, pearl ink, cholesteric ink, or an OVI (Optical Variable Ink) is used. The representative example of the latter may include the case where the cholesteric ink is used. This is a different change method according to a rotation direction of a circularly polarizing plate.

In the RFID information medium of the present invention, a communication scheme in transmission and reception of the data may be a radio wave scheme. According to the RFID information medium of the present invention, communication can be performed surely and a communication distance can be farther when compared to an RFID information medium using electrostatic coupling or electromagnetic induction. In the case of the radio wave scheme, representative frequencies may include 2.45 GHz in a microwave band and 950 MHz in a UHF band.

The present invention is an article to which the above-described RFID information medium is attached.

In the article of the present invention, the RFID information medium may be directly attached to the article and the RFID information medium may be attached to a package in which the article is packaged.

According to the article of the present invention, the management of the article, for example, can be easily performed and the counterfeit of the article can be prevented while showing the effect of excellent decoration.

Advantageous Effects of the Invention

According to the present invention, a combination of a conductor for an antenna or a combination of a conductor for an antenna member can function as one antenna. Thereby, communication with a data read/write device can be performed properly even when the conductor is attached to the main body section. Since the conductor does not need to be arranged by separating it from the antenna (or antenna member), the RFID information medium can be easily miniaturized.

DESCRIPTION OF THE REFERENCE SYMBOLS 1A to 1D: RFID TAG (RFID INFORMATION MEDIUM)
2: MAIN BODY SECTION
3: OVD (OPTICAL VARIABLE DEVICE)
11: ANTENNA
11a: ANTENNA MEMBER
20: ARTICLE
21: PACKAGE

BEST MODE FOR CARRYING OUT THE INVENTION

Hereinafter, an RFID information medium according to a first embodiment of the present invention will be described with reference to FIGS. 1 and 2.

Figure 1:
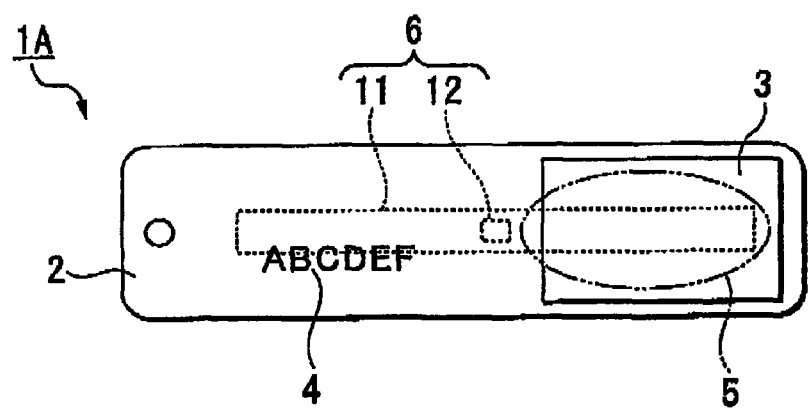
FIG. 1 is a plan view showing an RFID tag as an RFID information medium that is a first embodiment of the present invention.

FIG. 1 shows an example in which the RFID information medium is applied to an RFID tag. For example, an RFID tag 1A is used as a brand tag of an apparel maker.

The RFID tag 1A is provided with a main body section 2 extending in a plate shape. As shown in FIG. 2, the main body section 2 is provided with a first substrate 7 and a second substrate 8 all having a plate shape. As long as the material of the first substrate 7 and the second substrate 8 is an insulating material, it is not especially limited and may include, for example, PET, PVC, ABS, and papers.

Adhesion layers 9 are provided on an inner surface of the first substrate 7 directed to the second substrate 8 and an inner surface of the second substrate 8 directed to the first substrate 7, respectively. As the material of the adhesion layers 9, an acrylic thermal adhesive, for example, a hot-melt resin of polyimide, urethane, or EVA, or a pressure-sensitive adhesive is adopted. When the material of the adhesion layers 9 is a thermal adhesive type, the first substrate 7 and the second substrate 8 are solidly bonded by melting the adhesion layers 9 with heat and solidifying the adhesion layers 9.

An IC inlet 6 is embedded in the main body section 2. That is, the substrate 7 and the second substrate 8 are bonded through the IC inlet 6. The IC inlet 6 is provided on a sheet-shaped support body (not shown), and is provided with an antenna 11 and an IC chip 12 having a storage section to store information. The IC chip 12 can communicate with an external reader through the antenna 11 in a noncontact manner. In this embodiment, the antenna 11 is arranged to extend in a length direction of the main body section 2, from the reason that it is easy to reduce the area of the RFID tag.

The antenna 11 is a half-wavelength dipole antenna with conductivity to receive a radio wave from an antenna connected to a read/write device (not shown) provided in an outside location. As a representative example, the half-wavelength dipole antenna is an etching antenna formed by patterning, for example, a metal foil of copper, or aluminum formed on a sheet-shaped substrate as a support body made of a material, such as, PET, polyimide, and PVC, in a proper shape using an etching process, or a printed antenna formed by patterning conductive ink including a metal material of, for example, silver, nickel, or copper on a sheet-shaped substrate made of, for example, PET or paper in a proper shape using a print process.

The half-wavelength dipole antenna does not have good radio wave directivity, but is one of antennas that can be made at the lowest cost as an IC inlet for the RFID tag since there is a merit in that the number of antennas per sheet is large when it is formed on the sheet-shaped substrate serving as the support body from its long shape.

The length of the antenna 11 is set to ½ of the wavelength of a carrier of 2.45 GHz and the antenna 11 functions as an independent antenna by itself.

The IC chip 12 is arranged in the center of a length direction of the antenna 11 and connected to the antenna 11. The IC chip 12 is electrically connected to the antenna 11 by, for example, flip chip mounting, or wire bonding.

On a surface of the main body section 2 (a main surface of one side), an information indication 4, such as, a brand name, logo, or design image is printed. On the surface of the main body section 2, an optical variable device (hereinafter, referred to as OVD) 3 is provided by interposing an adhesion layer 10.

As the material of the adhesion layer 10, an acrylic thermal adhesive, for example, is adopted. When the material of the adhesion layer 10 is a thermal adhesive type, the OVD 3 is solidly bonded on the surface of the second substrate 8 by melting the adhesion layer 10 with heat and solidifying the adhesion layer 10.

The OVD may or may not have a reflective layer or a transparent layer. For example, when a metal or metal compound is adopted in the material of the reflective layer or the transparent layer, the reflective layer or the transparent layer may have conductivity.

When the RFID information medium of the present invention is provided with the OVD, the most preferred aspect is a configuration in which the reflective layer or the transparent layer of the OVD is used as a conductive material layer of the RFID information medium in a "combined use". When the RFID information medium is disassembled for illicit purpose, for example, the optical effect of the OVD is apt to be damaged and normal communication is apt to be disabled. It can be said that the present invention is highly effective such that it is possible to decrease the manufacturing cost or increase productivity. When the RFID information medium of the present invention is provided with the OVD, the next preferred aspect is a configuration in which a reflective layer or a transparent layer of the OVD is not used as the conductive material layer of the RFID information medium in the "combined use", or the OVD does not have a reflective layer or a transparent layer.

First, a representative example of the OVD is a relief type hologram or diffraction grating. These can all be produced by embossing and hence are proper for mass replication. There is a volume type hologram that records an interference pattern directed to an inner side of a main body (and does not generally have the reflective layer or the transparent layer with the above-described conductivity), or a multiplayer thin film capable of obtaining the color shift effect by properly overlapping a plurality of optical interference thin films with different refractive indexes. Ink to be used in an optical variable device (OVD) adopting special ink includes pearl ink using pearl pigment, cholesteric ink using pigment with cholesteric liquid crystal, ink using a material to well absorb an electromagnetic wave (such as, for example, ultraviolet ray, and infrared ray) of a given wavelength band and ink using a fluorescing material of an electromagnetic wave (such as, for example, visible light, ultraviolet light, and infrared light) of a given wavelength band excited by radiating an electromagnetic wave (such as, for example, visible light, ultraviolet light, and infrared light) of a given wavelength band. In general, the reflective layer or the transparent layer with the conductivity is not essential in the ink.

In general, the relief type hologram is mass-replicated by a well-known method that manufactures a relief type master hologram formed from a minute concave-convex pattern according to an optical photographing method, copies a nickel press plate on which the concave-convex pattern is copied by an electroplating method, and presses the press plate on a hologram formation layer while heating it.

On the other hand, unlike the relief type hologram, the volume type hologram records an interference pattern directed to the inner side using a recording material of, for example, a photosensitive resin. As this type of hologram, a so-called Lippmann hologram is generally used.

Unlike a hologram image, a grating image expressing an image by arranging a plurality of types of simple diffraction gratings as pixels in a minute area or a diffraction grating image called a pixel gram are also mass replicated using the same method as the relief type hologram. On the other hand, a device of a multilayer thin film formed of stacked thin films such as ceramic and metal materials having different optical characteristics in which the color of the multilayer thin film changes when looked at from different angles (color shift) is also one example of an OVD. The manufacturing method of an OVD differs from that of a hologram and diffraction grating. When the productivity or cost is considered, it is preferable to adopt a device of the relief type hologram (diffraction grating) or the multiplayer thin film method among the above-described OVDs. In order to obtain the optical effect, the relief type hologram (diffraction grating) requires a reflective layer for reflecting light. Therefore, the relief type hologram has a metal thin film (such as, for example, an aluminum deposited layer) or a transparent reflective film (a transparent thin film having a higher refractive index than a minute concave-convex layer) showing reflectivity according to an observation angle. When the transparent reflective film of the latter is applied to the present invention, it is preferred that the transparent conductive film has conductivity. When the device of the multiplayer thin film scheme is applied to the present invention, a conductive material is used in a thin film of a proper layer.

In the present invention, the conductive material layer of the OVD 3 functions as part of the antenna. When the conductive material layer exists on the entire surface of the OVD 3, the shape of the OVD 3 just forms part of the antenna shape.

In terms of the design of an antenna pattern, the form of the OVD 3 can be set to preferentially increase the antenna gain or efficiency, and the form of the OVD 3 can be set to preferentially improve the design even when the antenna gain or efficiency is sacrificed. When part of the OVD 3 is conductive and the other part is non-conductive, the shape of the non-conductive part can be designed freely.

The OVD 3 overlaps the part of the antenna 11 through the second substrate 8 in the thickness direction of the main body section 2. That is, when the main body section 2 is viewed from the front, the OVD 3 overlaps a region closer to one end of the antenna 11 than the IC chip 12. In other words, the OVD 3 is arranged to face the region closer to one end of the antenna 11 than the IC chip 12 through the second substrate 8 made of an insulating material in the thickness direction of the main body section 2.

In the following, the function of the RFID tag 1A in this embodiment configured as described above will be described.

First, the RFID tag 1A moves to a read/write device for radiating a radio wave of 2.45 GHz. Then, the antenna 11 receives the radio wave from the read/write device and supplies power to the IC chip 12. Thereby, the IC chip 12 operates and performs various processes. For example, various types of information stored in the storage section of the IC chip 12 is read and the various types of information is loaded on a carrier and radiated through the antenna 11. The read/write device receives the radio wave radiated from the antenna 11 and reads various information of the IC chip 12.

Figure 2:
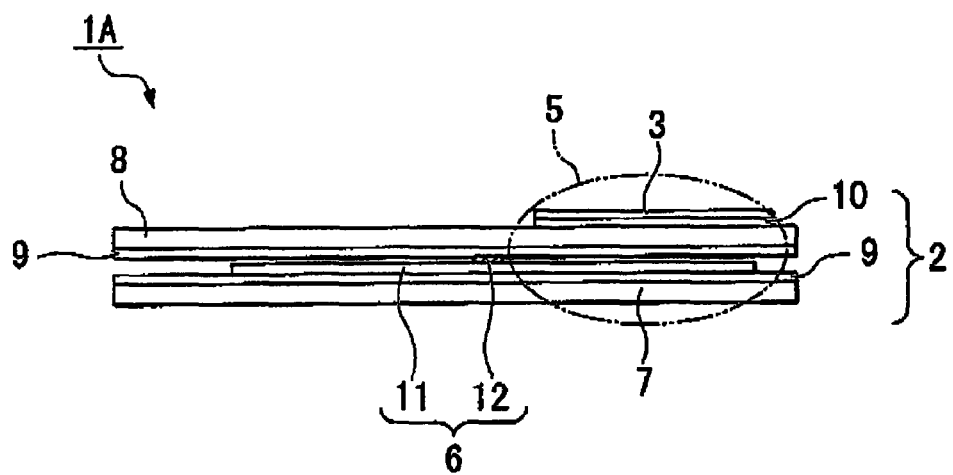
FIG. 2 is a cross-sectional view showing a condition in which an RFID of FIG. 1 is cut in the thickness direction.

Here, in the RFID tag 1A in this embodiment the antenna 11 and the OVD 3 are coupled capacitively and connected electrically since the OVD 3 is arranged to face the region close to the one end rather than the IC chip 12 of the antenna 11 through the second substrate 8 made of the insulating material in the thickness direction of the main body section 2 as shown in FIG. 2. According to a detailed description, in FIG. 2, a region surrounded by a dashed-two dotted line becomes a capacitive coupling section 5 of the OVD 3 and the antenna 11, and the capacitive coupling section 5 becomes a condenser in an electrical circuit, such that the OVD 3 and the antenna 11 are connected electrically. When electrical coupling capacity of the capacitive coupling section 5 has a capacity of around at least 1 PF in the case of a communication frequency of 2.45 GHz, high frequency conduction can be achieved.

Thereby, the antenna 11 and the OVD 3 function as one antenna (hereinafter, referred to as "coupled antenna") by cooperation. Through the coupled antenna having the antenna 11 and the OVD 3, data is transmitted and received between an external read/write device and the RFID tag 1A in a non-contact manner.

In a state in which the antenna 11 and the OVD 3 are coupled capacitively, the region close to the one end rather than the IC chip 12 of the antenna 11 does not contribute to communication and the OVD 3 becomes dominant, so that the OVD 3 is mainly responsible for an antenna function.

According to the RFID tag 1A of this embodiment, the antenna 11 and the OVD 3 can function as one antenna by overlapping part of the antenna 11 and the OVD 3. Thereby, proper communication with the read/write device can be performed even when the OVD 3 is attached to the main body section 2. The RFID tag 1A can be miniaturized easily. A restriction of, for example, the size, design of the OVD 3 can be reduced.

In the present invention, it is preferred that a pattern length of the entire antenna configured by combining a pattern of the conductive material layer of the OVD 3 and a pattern of the antenna 11, that is, the total length in which the conductive material layer of the OVD 3 and the antenna 11 are combined, is the same as the length of the original half-wavelength dipole antenna or in the same range from an antenna performance standpoint. The total antenna width (pattern width of the conductive material layer of the OVD 3) may increase in the range where the size of the RFID tag 1A is permitted.

In addition to the description in this embodiment for the arrangement of (the conductive material layer pattern of) the OVD 3, for example, a plurality of (conductive material layer patterns of) OVDs 3 may overlap a plurality of positions of the original antenna 11 and (the conductive material layer patterns of) the OVDs 3 may be provided on the front and back sides of the main body section 2.

According to the RFID tag 1A, the true/false judgment of the RFID tag 1A can be performed from both a read operation by the read/write device and a visual contact. For example, when there is no read/write device, the true/false of the RFID tag 1A can be judged by viewing the OVD 3.

In the case where it is used as an advanced anti-counterfeiting medium, it is possible to perform the true/false judgment when either the OVD 3 or the IC chip 12 is faked, by recording machine-readable optical information in the OVD 3 and making a connection with information within the IC chip 12. When optical information recorded in the OVD 3 is encrypted, the anti-counterfeit can be further improved.

Since part of the antenna 11 and the OVD 3 are electrically connected in the thickness direction of the main body section 2 by capacitive coupling, the antenna 11 and the OVD 3 can simply and surely function as one antenna.

Since communication is performed in the radio wave scheme, data can be transmitted and received surely and a communication distance can be lengthened.

Next, a second embodiment of the present invention will be described with reference to FIGS. 3 and 4.

Figure 3:
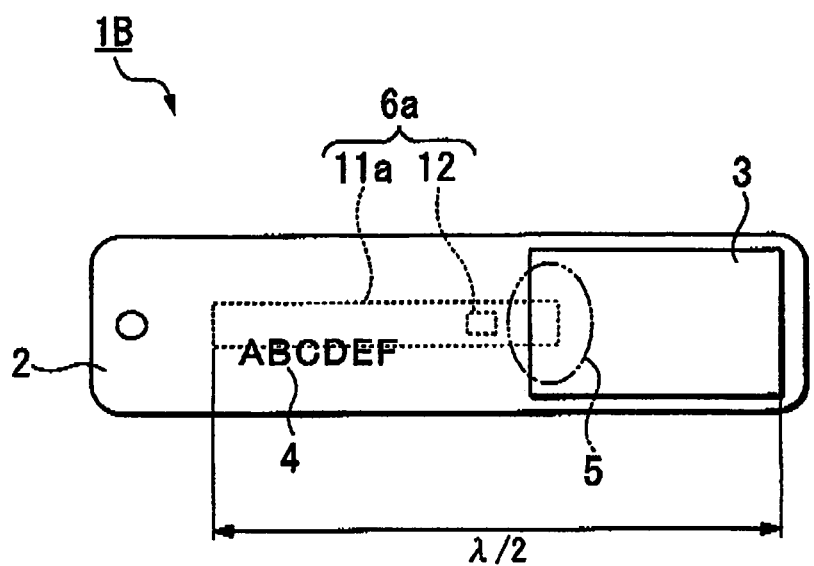
FIG. 3 is a plan view showing an RFID tag as an RFID information medium that is a second embodiment of the present invention.
Figure 4:
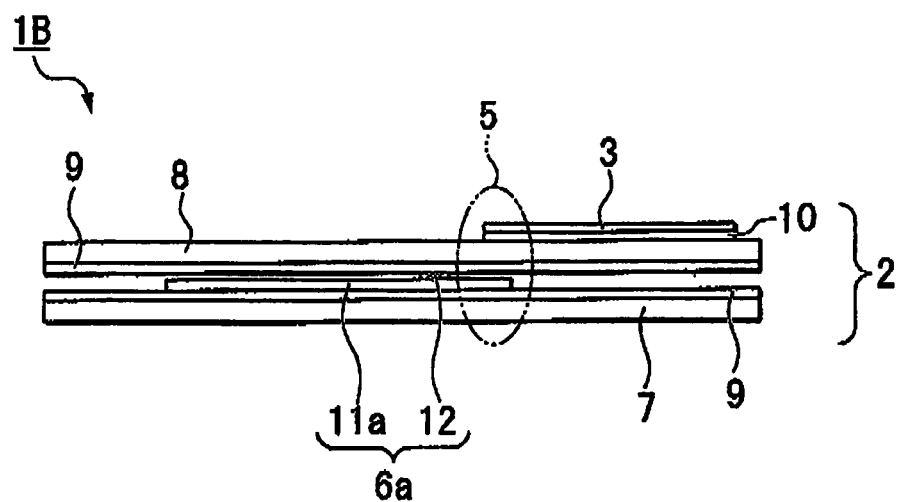
FIG. 4 is a cross-sectional view showing a condition in which an RFID of FIG. 3 is cut in the thickness direction.

In FIGS. 3 and 4, the same reference numerals are assigned to the same parts as the components of FIGS. 1 and 2 and their description is omitted. Since a basic configuration of this embodiment is the same as that of the first embodiment, differences from the first embodiment will be described hereunder.

In this embodiment, an IC inlet 6a is provided with an antenna member 11a formed in a long shape. The IC inlet 6a is different from the above-described IC inlet 6 in that the antenna member 11a is provided without the antenna 11.

A length of the antenna member 11a is shorter than a length in which communication is possible at a wavelength λ of a carrier of 2.45 GHz. Here, the length in which communication is possible is a predetermined length in which resonance is possible, such as, for example, ½, ¼ of the carrier wavelength λ. In this embodiment, the length in which antenna communication is possible is set to ½ of the carrier wavelength λ, and the length of the member 11a is shorter than ½ of the carrier wavelength λ.

Figure 5:
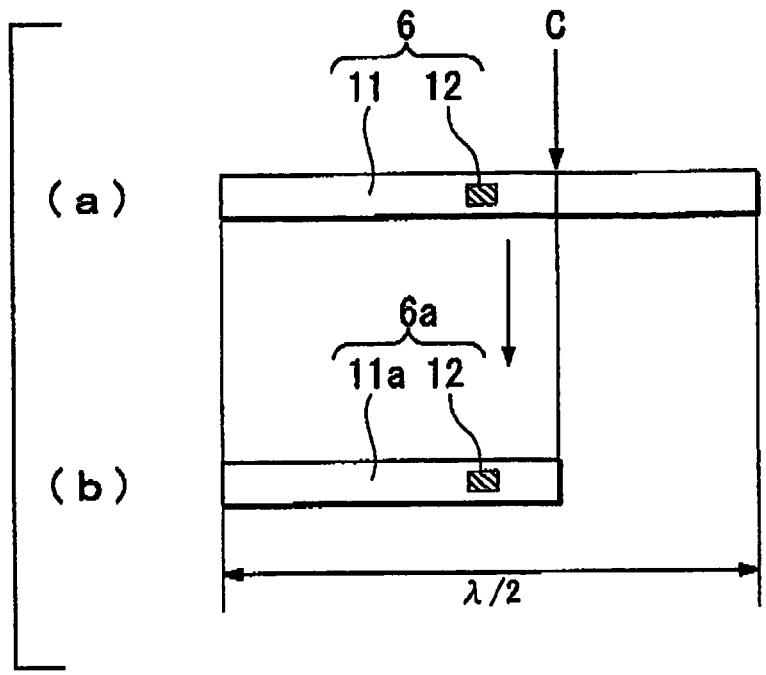
FIG. 5 is an illustrative view comparing and showing an antenna before and after cutting.

Specifically, as shown in FIG. 5, the antenna member 11a (indicated by (b) in FIG. 5) is formed by cutting the antenna 11 with the length of ½ of the carrier wavelength λ at a position C around the IC chip 12 arranged in the center of the antenna 11 (indicated by (a) in FIG. 5).

Thereby, the antenna member 11a does not function as an independent antenna by itself. That is, the antenna member 11a cannot communicate with an external reader using only the IC inlet 6a by cutting part of one side of the antenna 11.

As shown in FIG. 3, when viewing an RFID tag 1B from the thickness direction of the main body section 2 (viewing the main body section 2 from the front), the total length in which the antenna member 11a and the OVD 3 are combined (the length from one end of the antenna member 11a to the other end of the OVD 3) is ½ of the carrier wavelength λ. That is, it is the total length in which communication is possible using the antenna member 11a and the OVD 3.

In the present invention, (the conductive material layer pattern of) the OVD 3 overlaps the cut side of the antenna 11.

When the RFID tag 1B configured as described above moves to the reader, communication is performed in the same manner as described above.

According to the RFID tag 1B in this embodiment, one coupled antenna is formed by cooperation of the antenna member 11a and the OVD 3, and communication with the reader can be performed easily through the coupled antenna.

Since the antenna member 11a cannot function as an independent antenna, the RFID tag 1B cannot communicate with reader when the OVD 3 is separated. Thereby, security can be improved.

A verification test was performed for the RFID tag 1B of this embodiment. The RFID tag used in this test is obtained by combining an IC inlet of 2.45 GHz as a frequency at which communication of the radio wave scheme is possible and an OVD of a surface-relief type hologram having an aluminum deposited layer as a reflective thin film. When an overlap region between the two was set to a rectangle of about 1.5 mm×about 1.5 mm and an interval between the two was set to about 100 μm, the required coupling capacity could be obtained, thereby making it possible to perform communication with an external reader.

However, each RFID tag of the above-described first and second embodiments is a brand tag, but the RFID information medium of the present invention is not limited to the brand tag. For example, a card, coin, label, and stick are possible and printed materials such as, for example, securities are possible.

A half-wavelength dipole antenna has been illustrated as the antenna 11 and the antenna member 11a, but the form of any antenna in which communication of the radio wave scheme is possible is not limited to the half-wavelength dipole antenna.

In the second embodiment, the antenna member 11a has been formed by cutting part of one side of the antenna 11, but the antenna member may be formed by cutting each of two sides of the antenna 11.

In addition to the description in this embodiment for the arrangement of (the conductive material layer pattern of) the OVD 3, for example, a plurality of (conductive material layer patterns of) OVDs 3 may overlap a plurality of positions of the antenna member 11a, or (the conductive material layer patterns of) the OVDs 3 may be provided on to front and back sides of the main body section 2. In the present invention, it is preferred that a pattern length of the entire antenna configured by combining a pattern of the conductive material layer of the OVD 3 and a pattern of the antenna member 11a is the same as the length of the original half-wavelength dipole antenna or in the same range from an antenna performance standpoint. The total antenna width (pattern width of the conductive material layer of the OVD 3) may increase in the range where a size of the RFID tag 1B is permitted.

Modified examples of the RFID tag according to the present invention are shown in FIGS. 6 to 11.

Figure 6:
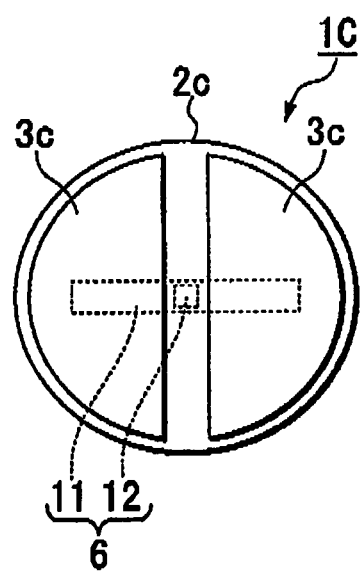
FIG. 6 is a plan view showing a modified example of the RFID information medium of the present invention.

First, an RFID tag 1C shown in FIG. 6 is provided with a main body section 2c formed in a circular plate shape, an IC inlet 6 arranged on the main body section 2c, and two OVDs 3c arranged on the main body section 2c. Both of the two OVDs 3c are formed in a plate shape of a substantial semicircle. One OVD 3c is arranged to overlap one end of the antenna 11 configuring the IC Inlet 6 through an insulating material configuring the main body-section 2c, and the other OVD 3c is arranged to overlap the other end of the antenna 11 through the same insulating material. The two OVDs 3c are arranged so that a circular arc portion configuring part of a peripheral border is formed along an outer line of the main body section 2c and straight line shaped portions are in parallel with each other. An IC chip 12 configuring the IC inlet 6 is arranged between the two OVDs 3c arranged separately.

Figure 7:
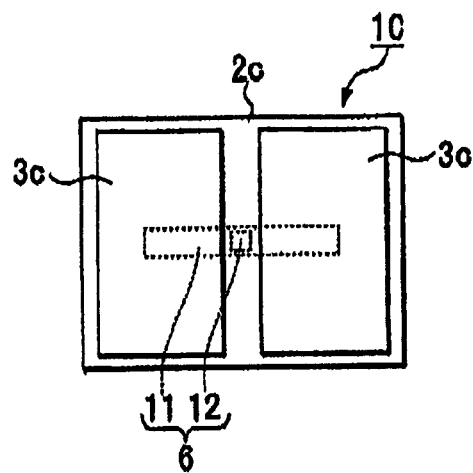
FIG. 7 is a plan view showing a modified example of the RFID information medium of the present invention.
Figure 8:
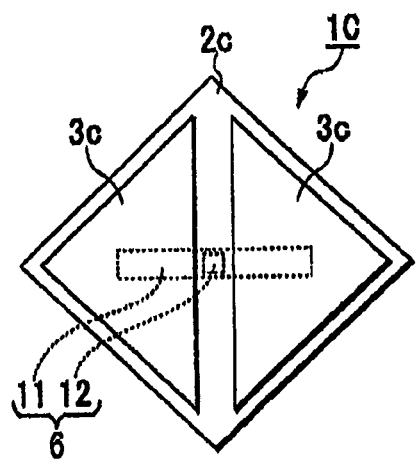
FIG. 8 is a plan view showing a modified example of the RFID information medium of the present invention.

The shape of the two OVDs is not limited to the semicircle, and may be a rectangle as shown in FIG. 7 or a triangle as shown in FIG. 8. It is not limited to the finite form and various shapes may be adopted. For example, it may be a shape in which the silhouette of a natural object such as, an animal or plant is molded. The shape of the main body section may be changed properly according to the OVD shape.

Figure 9:
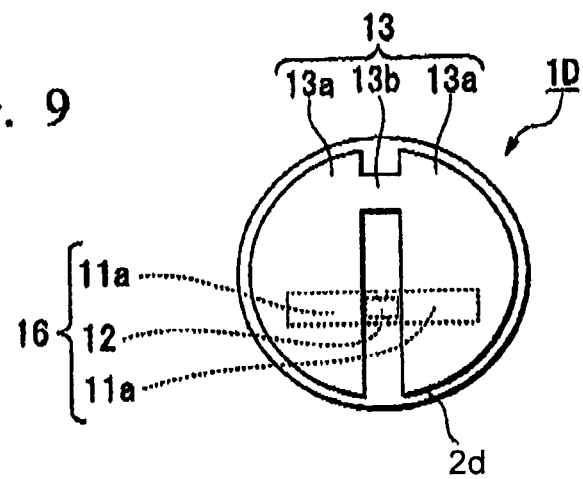
FIG. 9 is a plan view showing a modified example of the RFID information medium of the present invention.

An RFID tag 1D shown in FIG. 9 is provided with a main body section 2d formed in a circular plate shape, an IC inlet 16 arranged on the main body section 2d, and an OVD 13 arranged on the main body section 2d. The IC inlet 16 is provided with two antenna members 11a arranged in a length direction and an IC chip 12 laid across between the two antenna members 11a. The OVD 13 includes two plate-shaped sections 13a of a substantial semicircle and a connection section 13b that is integrated with the two plate-shaped sections 13a and connects the two plate-shaped sections 13a. One plate-shaped section 13a is arranged to overlap one antenna member 11a through an insulating material configuring the main body section 2d, and the other plate-shaped section 13a is arranged to overlap the other antenna member 11a through the same insulating material. The plate-shaped sections 13a are arranged so that a circular arc portion configuring part of a peripheral border is formed along an outer line of the main body section 2d and straight line shaped portions are in parallel with each other. An IC chip 12 is arranged between the two plate-shaped sections 13a arranged separately.

Figure 10:
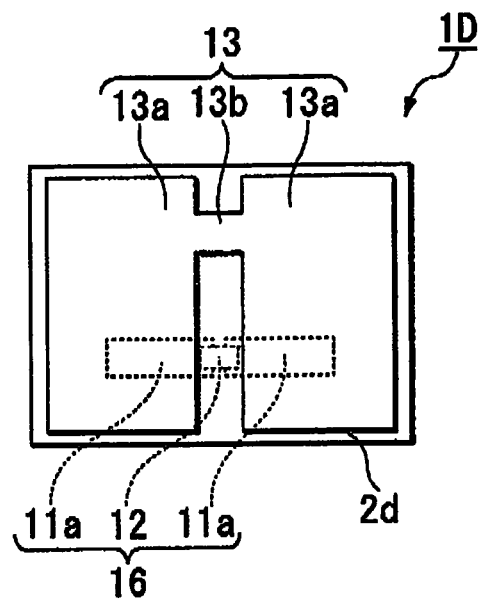
FIG. 10 is a plan view showing a modified example of the RFID information medium of the present invention.
Figure 11:
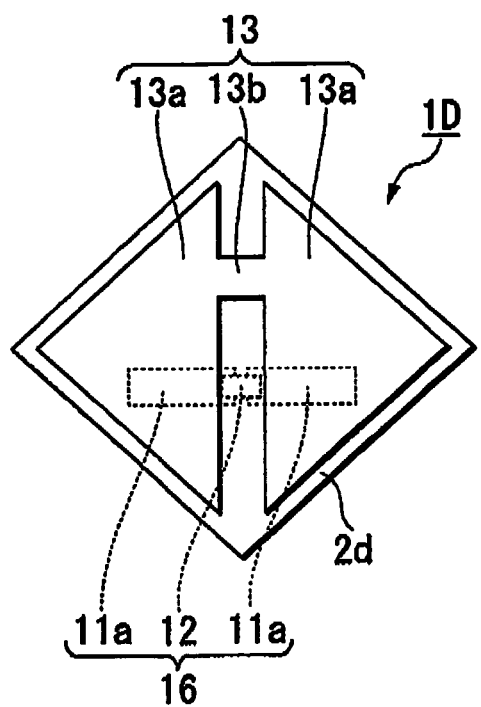
FIG. 11 is a plan view showing a modified example of the RFID information medium of the present invention.

As described above, the shape of the two plate-shaped sections configuring the OVD is not limited to the semicircle, and may be a rectangle as shown in FIG. 10 or a triangle as shown in FIG. 11. It is not limited to the finite form and various shapes may be adopted. For example, it may be a shape in which the silhouette of a natural object such as an animal or plant is molded. The shape of the main body section may be changed properly according to the OVD shape.

Next, a third embodiment of the present invention will be described with reference to FIG. 12.

Figure 12:
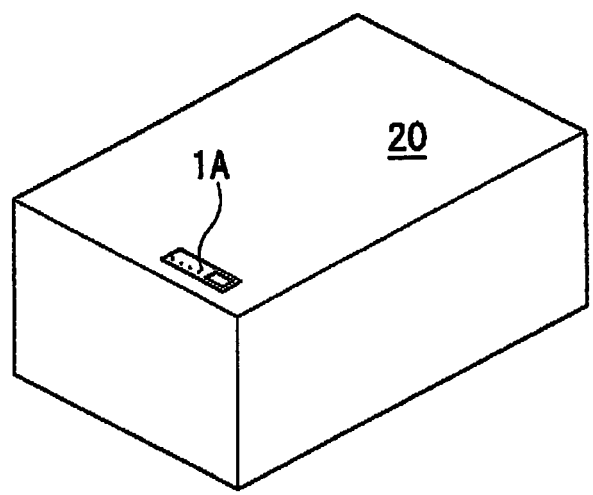
FIG. 12 is a perspective view showing article to which the RFID tag is attached that is a third embodiment of the present invention.

In FIG. 12, the same reference numerals are assigned to the same parts as the above-described components and their description is omitted.

FIG. 12 shows an article 20 to which the above-described RFID tag 1A is directly attached. For the article 20, managements of a distribution process such as goods in stock, loading and unloading of the goods, lending of the goods can be effectively performed using the RFID tag 1A. A design or classy fooling of the article 20 can be improved or the counterfeit can be prevented.

Figure 13:
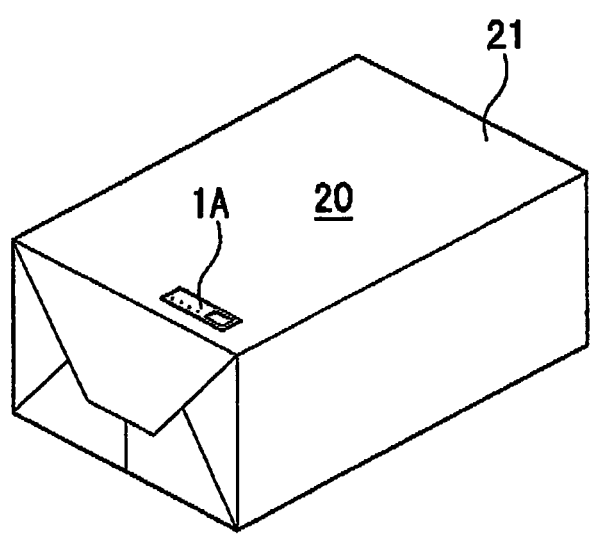
FIG. 13 is a perspective view showing a modified example of the article of the present invention.

In this embodiment, an example in which the RFID tag 1A is directly attached to the article has been illustrated, but the article of the present invention may be attached to a package 21 in which the article 20 is packaged as shown in FIG. 13.

While preferred embodiments of the present invention have been described and illustrated above, the invention is not limited to the embodiments. Additions, omissions, substitutions, and other modifications of the configuration can be made without departing from the spirit of the present invention. The invention is not to be considered as being limited by the foregoing description and is only limited by the scope of the appended claims.

INDUSTRIAL APPLICABILITY

The present invention relates to an RFID information medium for transmitting and receiving data to and from an external reader in a noncontact manner, the medium including: a main body section having an insulating member; an antenna or antenna member arranged on the main body section; and a conductor arranged on the main body section, wherein the conductor has a conductive material layer and the conductive material layer partially overlaps the antenna or antenna member in a thickness direction of the main body section. The RFID information medium of the present invention can properly communicate with a reader (or read/write device) and can be easily miniaturized.

The invention claimed is:

1. An RFID information medium for transmitting and receiving data to and from an external reader in a noncontact manner, comprising:
   a main body section having an insulating member having a plate shape;
   an antenna member arranged on a first side of the insulating member;
   an IC chip arranged on the first side of the insulating member and directly connected to the antenna member; and
   an optical variable device in which a color or image changes according to a point of view, the optical variable device comprising a conductive metal layer that is one of a conductive reflective layer or a conductive transparent layer, the optical variable device being arranged on a second side of the insulating member, the conductive metal layer partially overlapping the antenna member in a vertical direction of the main body section, and the optical variable device being electrically connected with the antenna member in the vertical direction by capacitive coupling, wherein
   the antenna member has an antenna function generated by cooperating with the optical variable device without an independent antenna function.

2. The RFID information medium of claim 1, wherein the antenna member has an antenna function generated by cooperating with the conductor without an independent antenna function.

3. The RFID information medium of claim 1, wherein the antenna member is formed of a dipole antenna in a long shape, a length of the antenna member is set to be shorter than a length in which communication is possible with respect to a wavelength of a carrier for performing data communication, and a combined length of the overlapped antenna member and conductor is set to a length in which communication is possible.

4. The RFID information medium of claim 1, wherein a communication scheme in transmission and reception of the data is a radio wave scheme.

5. An article to which the RFID information medium of claim 1 is attached.

6. The article of claim 5, wherein the RFID information medium is directly attached to the article.

7. The article of claim 5, wherein the RFID information medium is attached to a package for packaging the article.

* * * * *